United States Patent
Nasser et al.

(10) Patent No.: US 11,231,123 B2
(45) Date of Patent: Jan. 25, 2022

(54) CONTROL VALVE ASSEMBLY WITH SOLENOID WITH TWO MAGNETS FOR LATCHING

(71) Applicant: DELPHI TECHNOLOGIES IP LIMITED, St. Michael (BB)

(72) Inventors: Zeid J. Nasser, Webster, NY (US); Luis F. Barron, Victor, NY (US); Michael James Dinkel, Penfield, NY (US)

(73) Assignee: DELPHI TECHNOLOGIES IP LIMITED

( * ) Notice: Subject to any disclaimer, the term of this patent is extended or adjusted under 35 U.S.C. 154(b) by 181 days.

(21) Appl. No.: 15/851,771

(22) Filed: Dec. 22, 2017

(65) Prior Publication Data
US 2019/0195383 A1    Jun. 27, 2019

(51) Int. Cl.
*F16K 31/08* (2006.01)
*F16K 31/06* (2006.01)
*F16K 1/14* (2006.01)

(52) U.S. Cl.
CPC ............ *F16K 31/082* (2013.01); *F16K 1/14* (2013.01); *F16K 31/0634* (2013.01); *F16K 31/0665* (2013.01)

(58) Field of Classification Search
USPC ............................................. 137/596, 599.07
See application file for complete search history.

(56) References Cited

U.S. PATENT DOCUMENTS

| | | | |
|---|---|---|---|
| 3,634,735 A * | 1/1972 | Komatsu | H01F 7/1646 361/194 |
| 3,814,376 A | 6/1974 | Reinicke | |
| 4,538,129 A * | 8/1985 | Fisher | F16K 31/082 137/625.65 |
| 6,040,752 A * | 3/2000 | Fisher | H01F 7/1615 335/229 |
| 6,498,416 B1 * | 12/2002 | Oishi | F02M 51/0614 310/214 |
| 6,880,570 B2 | 4/2005 | Moreno et al. | |
| 8,240,636 B2 * | 8/2012 | Smith | F16K 31/082 251/129.19 |
| 8,746,276 B2 | 6/2014 | Bill et al. | |
| 8,912,871 B2 * | 12/2014 | Lauraire | H01H 3/28 218/120 |
| 9,016,633 B2 | 4/2015 | Asfia et al. | |

(Continued)

*Primary Examiner* — Daphne M Barry
(74) *Attorney, Agent, or Firm* — Joshua M. Haines

(57) ABSTRACT

A valve assembly includes an inlet; an outlet; a valve seat between the inlet and the outlet; a valve member which moves between a first valve member position and a second valve member position; and a solenoid subassembly which allows the valve member to move between the first valve member position and the second valve member position. The solenoid subassembly includes a coil having a coil first end and a coil second end; an armature which reciprocates, based on polarity of an electrical current applied to the coil, between a first armature position which allows the valve member to move to the first valve member position and a second armature position which allows the valve member to move to the second valve member position; a first magnet which latches the armature in the first armature position; and a second magnet which latches the armature in the second armature position.

15 Claims, 3 Drawing Sheets

(56) References Cited

U.S. PATENT DOCUMENTS

2006/0097209 A1    5/2006  Barron et al.
2010/0179464 A1*  7/2010  Smith .................. F16K 31/082
                                                           604/6.1

* cited by examiner

CONTROL VALVE ASSEMBLY WITH SOLENOID WITH TWO MAGNETS FOR LATCHING

TECHNICAL FIELD OF INVENTION

The present invention relates to a solenoid-actuated control valve; more particularly to a solenoid-actuated control valve which employs magnets to eliminate the need to constantly supply electricity to a coil of the solenoid in order to maintain a state of operation.

BACKGROUND OF INVENTION

Solenoid-actuated control valves, herein after referred to as control valves, are well known to control the flow and/or pressure of a fluid. In such control valves, electric current is applied to a coil of the solenoid. This application of electric current causes a magnetic attraction between an armature and a pole piece, thereby resulting in a valve opening or closing depending on the design needs. Conversely, when electric current is ceased, a return spring or application of pressure causes the armature to return to its original position, thereby reversing the operational state of the valve, i.e. closing the valve if it had been open or opening the valve if it had been closed. In some implementations of control valves, the solenoid is supplied with electric current for long periods of time in order to maintain one state of operation, i.e. either open or closed, which leads to high electrical usage and inefficiency.

What is needed is a control valve which minimizes or eliminates one or more of the shortcomings set forth above.

SUMMARY OF THE INVENTION

Briefly described, a valve assembly includes an inlet which communicates fluid into the valve assembly; an outlet which discharges fluid from the valve assembly; a valve seat between the inlet and the outlet; a valve member which moves with respect to the valve seat between a first valve member position and a second valve member position such that the first valve member position provides greater restriction between the inlet and the outlet compared to the second valve member position; and a solenoid subassembly which allows the valve member to move between the first valve member position and the second valve member position. The solenoid subassembly includes a coil wound about an axis and having a coil first end and a coil second end; an armature which reciprocates, based on polarity of an electrical current applied to the coil first end and the coil second end, between 1) a first armature position which allows the valve member to move to the first valve member position and 2) a second armature position which allows the valve member to move to the second valve member position; a first magnet which latches the armature in the first armature position; and a second magnet which latches the armature in the second armature position.

BRIEF DESCRIPTION OF DRAWINGS

This invention will be further described with reference to the accompanying drawings in which.

DETAILED DESCRIPTION OF INVENTION

Figure 1:
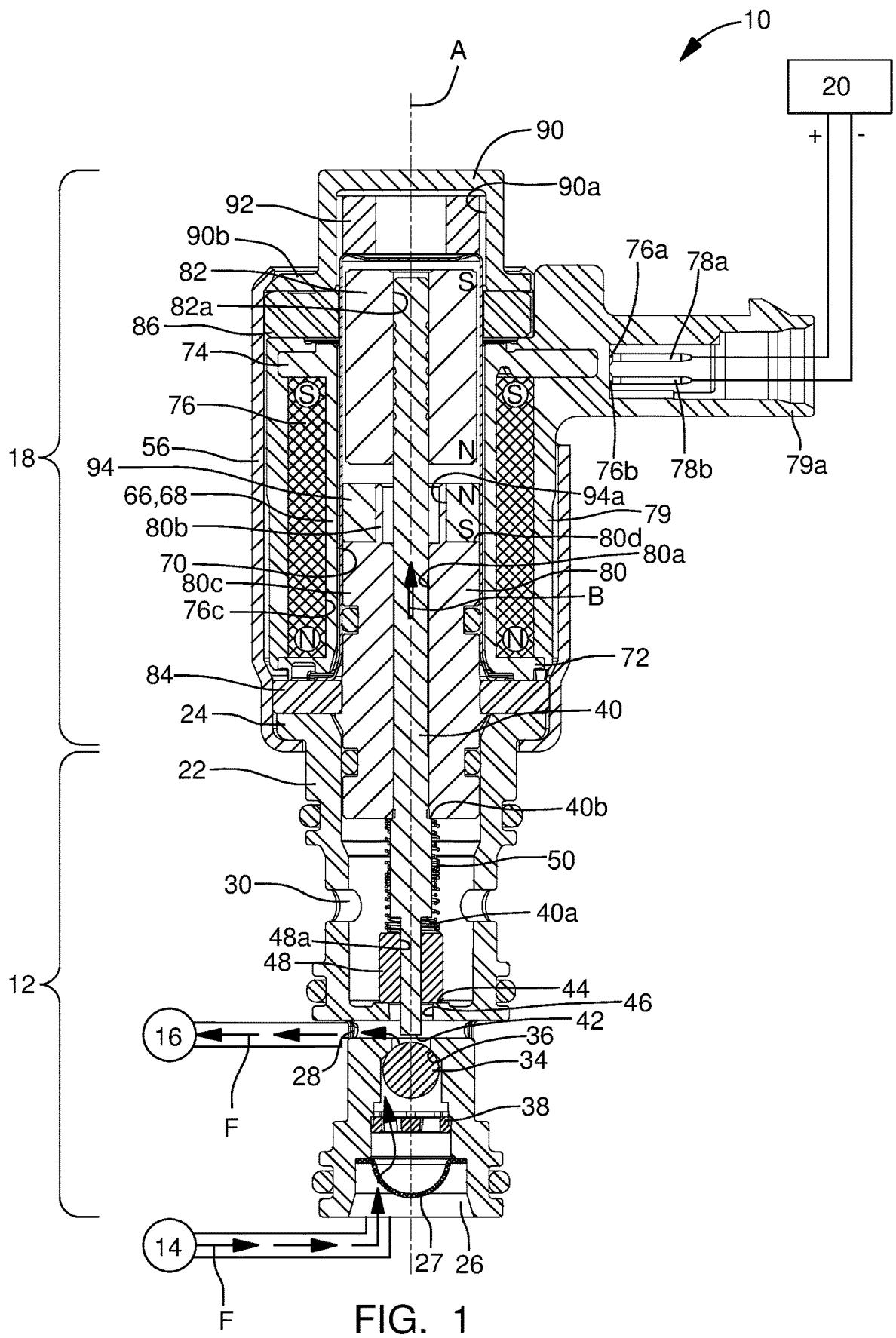
FIG. 1 is a cross-sectional view of a valve assembly in accordance with the present invention shown in one operational state.

In accordance with a preferred embodiment of this invention and referring to FIGS. 1-3 which are all the same view with the exception of components that are moved to achieve different operational states, a solenoid-actuated control valve 10 is shown, hereinafter referred to as valve assembly 10. Valve assembly 10 includes a hydraulic subassembly 12 in fluid communication with a fluid source 14 and a working device 16. Working device 16 may be, by way of non-limiting example only, a multi-step valve train device for an internal combustion engine or a transmission clutch for an automatic transmission of a motor vehicle. Furthermore, valve assembly 10 may be used in applications which control fluids that may be either a liquid or gas. Valve assembly 10 also includes solenoid subassembly 18 which is connected to hydraulic subassembly 12 and which controls fluid communication from fluid source 14 through hydraulic subassembly 12 to working device 16 based on an electric current which is supplied by an electric current source 20. Electric current source 20 may be, for example, an electronic controller.

Hydraulic subassembly 12 includes a hydraulic subassembly housing 22 which may be made, by way of non-limiting example only, from plastic by an injection molding process. Hydraulic subassembly housing 22 extends along a valve axis A and includes an attachment flange 24 at one axial end which is used to attach hydraulic subassembly 12 to solenoid subassembly 18. Hydraulic subassembly housing 22 also includes an inlet port 26 located in the axial end of hydraulic subassembly housing 22 which is distal from attachment flange 24. Inlet port 26 is in constant fluid communication with fluid source 14 and serves to communicate fluid into valve assembly 10. A filter 27 may be provided in inlet port 26 in order to prevent foreign matter present in the fluid from reaching the working members, i.e. valve members and seats, of hydraulic subassembly 12 and also from reaching working device 16. Hydraulic subassembly housing 22 also includes a working port 28 extending radially outward from hydraulic subassembly housing 22. Working port 28 is in constant fluid communication with working device 16 and is in variable fluid communication with inlet port 26 based on input from solenoid subassembly 18. Working port 28 serves as an outlet which discharges fluid from valve assembly 10 by supplying fluid to working device 16. Hydraulic subassembly housing 22 also includes an exhaust port 30 which is in variable fluid communication with working port 28 based on input from solenoid subassembly 18. As shown, hydraulic subassembly housing 22 includes annular grooves on the outer periphery thereof which are centered about valve axis A. These grooves receive respective O-rings which provide a seal with the device to which valve assembly 10 is mounted and prevents fluid leakage between inlet port 26, working port 28, and exhaust port 30 and also prevents leakage of fluid from the intended hydraulic circuit.

Hydraulic subassembly 12 also includes a supply valve member shown as a ball 34 which is located within inlet port 26 and which is selectively seated and unseated with a supply valve seat 36 that may be defined by hydraulic subassembly housing 22. Supply valve seat 36 is annular, centered about valve axis A, and formed between working port 28 and inlet port 26 to be smaller in diameter than ball 34. In order to retain ball 34 within inlet port 26, a ball retainer 38 may be provided. Ball retainer 38 may be secured, for example by press fit or welding, within a portion of inlet port 26 and ball retainer 38 includes one or more apertures therethrough that are sufficiently large to allow desired flow therethrough while still retaining ball 34 between supply valve seat 36 and ball retainer 38.

Hydraulic subassembly 12 is also provided with poppet rod 40 made of a non-magnetic material in order to transfer linear motion produced by solenoid subassembly 18 to ball 34 to selectively seat and unseat ball 34 with supply valve seat 36. Poppet rod 40 is centered about valve axis A and is sized to extend through supply valve seat 36 such that a clearance is formed radially outward of poppet rod 40 to allow fluid communication radially between hydraulic subassembly housing 22 and poppet rod 40 from inlet port 26 to working port 28. When ball 34 is to be unseated with supply valve seat 36, poppet rod tip 42 contacts ball 34 and urges ball 34 away from supply valve seat 36. In this way, ball 34 moves between a first ball position shown in FIG. 1 and a second ball position shown in FIG. 2 such that the first ball position provides a greater restriction between inlet port 26 and working port 28 as compared to the second ball position. In the embodiment shown, the first ball position provides restricted fluid communication between inlet port 26 and working port 28 through grooves 36a (only shown in FIG. 2) formed in supply valve seat 36 in order to provide continuous fluid flow or pressure to working device 16 in order to keep air purged between working port 28 and working device 16 or to provide lubrication to working device 16. However, it should be understood that the first ball position may alternatively prevent fluid communication between inlet port 26 and working port 28, by omitting grooves 36a, in other applications.

Hydraulic subassembly 12 is also provided with an exhaust seat 44 which is disposed within hydraulic subassembly housing 22 axially between working port 28 and exhaust port 30. Exhaust seat 44 is annular in shape, thereby defining an exhaust aperture 46 extending axially therethrough and coaxial with valve axis A. Exhaust aperture 46 is sized to allow poppet rod 40 to pass therethrough with sufficient radial clearance with poppet rod 40 to allow fluid communication radially between exhaust aperture 46 and poppet rod 40 from working port 28 to exhaust port 30. An exhaust valve member 48 is located between exhaust aperture 46 and exhaust port 30 and circumferentially surrounds poppet rod 40. Exhaust valve member 48 is sized to be larger in diameter than exhaust aperture 46 and includes an exhaust valve member bore 48a extending axially therethrough through which poppet rod 40 passes. Exhaust valve member bore 48a is sized to allow poppet rod 40 and exhaust valve member 48 to move axially independent of one another while preventing fluid from passing between the interface of poppet rod 40 and exhaust valve member bore 48a. Poppet rod 40 includes a first poppet rod shoulder 40a which faces toward exhaust valve member 48 such that first poppet rod shoulder 40a is larger in diameter than exhaust valve member bore 48a. In this way, first poppet rod shoulder 40a limits the extent to which poppet rod 40 travels downward as oriented in the figures and holds exhaust valve member 48 in against exhaust seat 44 in the state of operation shown in FIG. 2. Conversely, a second poppet rod shoulder 40b limits the extent to which poppet rod 40 travels upward as oriented in the figures as shown in FIGS. 1 and 3. One or more exhaust valve springs 50 are provided to bias exhaust valve member 48 toward exhaust seat 44 as will be described in greater detail later. Exhaust valve member 48 is selectively seated with exhaust seat 44 in order to prevent fluid communication between working port 28 and exhaust port 30 and is selectively unseated with exhaust seat 44 in order to permit fluid communication between working port 28 and exhaust port 30 as will also be described in greater detail later.

Solenoid subassembly 18 includes a solenoid housing 56 which is made of a magnetic metal and which is hollow. Within solenoid housing 56 is disposed a spool 66 which is made of a material which does not conduct electricity, for example, plastic. Spool 66 includes a spool cylinder 68 which is centered about valve axis A and which is hollow to define a spool bore 70 which extends axially through spool cylinder 68 centered about valve axis A. Spool 66 also includes spool rims 72, 74 which extend radially outward from the ends of spool cylinder 68. Spool rim 72 extends radially outward from the end of spool cylinder 68 which is proximal to hydraulic subassembly 12 while spool rim 74 extends radially outward from the end of spool cylinder 68 which is distal from hydraulic subassembly 12. Electrically conductive wire, i.e. insulated magnet wire, is wound around spool cylinder 68 about valve axis A between spool rims 72, 74 to form coil 76 which has a coil first end 76a connected to a first terminal 78a and which also has a coil second end 76b connected to a second terminal 78b. First terminal 78 and second terminal 78b are each electrically connected to electric current source 20 such that electric current source 20 is configured to switch the polarity between first terminal 78a and second terminal 78b. Coil 76 is hollow, thereby defining a coil passage 76c extending axially therethrough which is centered about valve axis A. Spool 66 and coil 76 together define a solenoid coil assembly. A plastic overmold 79 is provided over the outer periphery of the solenoid coil assembly and defines an electrical connector 79a containing first terminal 78a and second terminal 78b and is configured to mate with a complementary connector (not shown) for connection to electrical current source 20.

Solenoid subassembly 18 also includes a pole piece 80 made of a magnetic material. Pole piece 80 is tubular, thereby defining pole piece bore 80a extending axially therethrough such that pole piece bore 80a is centered about valve axis A. Pole piece bore 80a is sized to closely guide poppet rod 40, thereby allowing poppet rod 40 to move freely axially therewithin while substantially preventing radial movement of poppet rod 40 therewithin. Pole piece 80 includes a pole piece first section 80b at an end thereof that is distal from hydraulic subassembly 12 and a pole piece second section 80c which extends from pole piece first section 80b such that pole piece first section 80b is smaller in diameter than pole piece second section 80c, thereby forming pole piece shoulder 80d where pole piece first section 80b meets pole piece second section 80c. Pole piece first section 80b is located within spool bore 70 and pole piece second section 80c extends therefrom into hydraulic subassembly housing 22. As shown, pole piece 80 includes annular grooves on the outer periphery thereof that are centered about valve axis A and which receive respective O-rings which provide sealing to prevent fluid from passing from hydraulic subassembly 12 to solenoid subassembly 18 along the outer periphery of pole piece 80.

Solenoid subassembly 18 also includes an armature 82 which is made of a magnetic material, is centered about valve axis A, and is located within spool bore 70. Armature 82 includes an armature bore 82a extending axially therethrough such that armature bore 82a is centered about valve axis A. The end of poppet rod 40 that is distal from solenoid subassembly 18 extends into armature bore 82a and is fixed therewithin, by way of non-limiting example only, with an interference fit. Armature 82 is reciprocated by application of electric current applied to coil first end 76a and coil second end 76b as will be described in greater detail later between 1) a first armature position shown in FIGS. 1 and 3 which allows ball 34 to move into the first ball position and 2) a second armature position shown in FIG. 2 which allows ball 34 to move into the second ball position.

Solenoid subassembly 18 also includes a primary plate 84 and a secondary plate 86 which are each made of a magnetic material. Primary plate 84 and secondary plate 86 are each annular in shape and are centered about valve axis A such that primary plate 84 circumferentially surrounds pole piece 80 and such that secondary plate 86 circumferentially surrounds armature 82. An inner periphery of primary plate 84 engages an outer periphery of pole piece 80 and primary plate 84 is captured axially between spool rim 72 and hydraulic subassembly housing 22. Secondary plate 86 is located at the opposite end of spool 66 as primary plate 84, and consequently, secondary plate 86 is located proximal to spool rim 74.

Solenoid subassembly 18 also includes solenoid housing cover 90 which closes off the end of solenoid housing 56 which is distal from hydraulic subassembly 12. Solenoid housing cover 90 includes a solenoid housing cover bore 90a which extends axially into solenoid housing cover 90 such that solenoid housing cover bore 90a is centered about valve axis A. A solenoid housing cover flange 90b extends radially outward from the end of solenoid housing cover 90 that is proximal to spool 66 such that solenoid housing cover 90 is fixed to solenoid housing 56 by a crimp connection, i.e. the end of solenoid housing 56 is crimped over solenoid housing cover flange 90b. Similarly, hydraulic subassembly housing 22 is fixed to solenoid housing 56 by a crimp connection, i.e. the opposite end of solenoid housing 56 is crimped over attachment flange 24 of hydraulic subassembly housing 22.

Solenoid subassembly 18 also includes a first magnet 92 that is located within solenoid housing cover bore 90a and is centered about valve axis A. As shown, first magnet 92 may be annular in shape, but may alternatively be disk-shaped and may alternative be square rather than circular. First magnet 92 is used to move armature 82 to the first armature position and to latch armature 82 in the first armature position as will be described in greater detail later. First magnet 92 is preferably axially magnetized, i.e. the north pole and the south pole of first magnet 92 are oriented axially relative to each other along valve axis A.

Solenoid subassembly 18 also includes a second magnet 94 that is located within spool bore 70, is located within coil passage 76c, and is centered about valve axis A. As shown, second magnet 94 may be annular in shape and includes a second magnet bore 94a which extends axially therethrough. Second magnet 94 is positioned to circumferentially surround pole piece first section 80b and abut pole piece shoulder 80d, but may alternatively be positioned at the end of pole piece 80 such that there is no overlap between second magnet 94 and pole piece 80 in the direction of valve axis A. Second magnet 94 is axially magnetized, i.e. the north pole and the south pole of second magnet 94 are oriented axially relative to each other along valve axis A. By way of non-limiting example only, the north pole of second magnet 94 is oriented up as illustrated in the figures with "N" representing the north pole and the south pole of second magnet 94 is oriented down as illustrated in the figures with "S". However, this relationship of the north and south poles may be reversed, but it is important to know the polarity of second magnet 94 for operation of valve assembly 10 in order to apply electricity to first terminal 78a and second terminal 78b in proper polarity as will be described in greater detail later. Second magnet 94 is used to move armature 82 to the second armature position and to latch armature 82 in the second armature position as will be described in greater detail later. As should now be apparent, armature 82 is located axially between first magnet 92 and second magnet 94 such that armature 82, first magnet 92, and second magnet 94 are each axially aligned with each other.

In operation and referring to FIG. 1, valve assembly 10 is shown in an operational state which has caused armature 82 and poppet rod 40 to move upward in the direction of arrow B. Movement in the direction of arrow B is caused by applying electrical current to coil 76 with a polarity that produces a magnetic polarity in coil 76 and armature 82 that is opposite of the magnetic polarity of second magnet 94 as indicated by "N" for north and "S" for south on coil 76 and armature 82, thereby counteracting attraction between second magnet 94 and armature 82. Consequently, a combination of one or more of magnetic repulsion between second magnet 94 and armature 82, magnetic attraction between first magnet 92 and armature 82, and hydraulic force acting on ball 34 and/or poppet rod 40 causes armature 82 and poppet rod 40 to move upward in the direction of arrow B, thereby allowing ball 34 to be seated on supply valve seat 36 by urging from the hydraulic force from the fluid supplied by fluid source 14. It should be noted that in the embodied example, restricted fluid flow may be allowed as represented by flow arrows F in FIG. 1 in order to provide fluid flow or pressure to working device 16 in order to keep air purged between working port 28 and working device 16 or to provide lubrication to working device 16, however, alternative applications may allow for complete sealing between ball 34 and supply valve seat 36 to completely eliminate flow. With armature 82 moved to the first armature position, electrical current to coil 76 is ceased and armature 82 is maintained in the first armature position by being latched with the magnetic attraction between first magnet 92 and armature 82, thereby allowing ball 34 to remain in the first ball position. When electric current to coil 76 is ceased, it should be understood that the polarity of coil 76 and armature 82 will also cease. As used herein, the terms "latched" and "latches" are used to describe the condition of armature 82 being held in location by magnetic attraction in the absence of electrical current being supplied to coil 76. As shown in FIG. 1, electrical current may be supplied to coil 76 with a polarity such that first terminal 78a is positive and second terminal 78b is negative. However, it should be understood that this polarity may be reversed if the magnetic polarity of second magnet 94 is reversed or if the winding direction of the wire used to form coil 76 is reversed.

Figure 2:
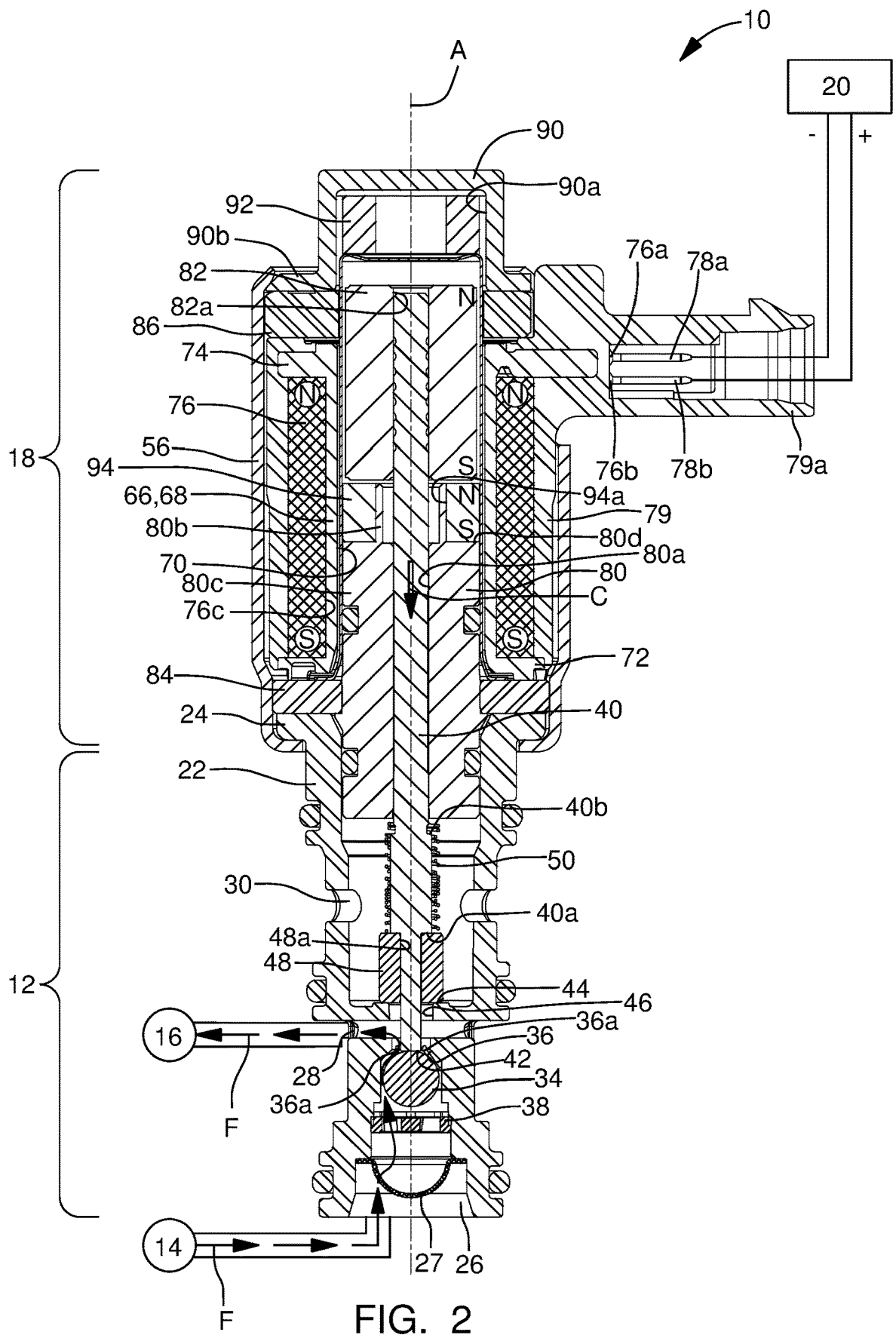
FIG. 2 is a cross-sectional view of the valve assembly of FIG. 1 now shown in another operational state.

In operation and now referring to FIG. 2, valve assembly 10 is shown in an operational state which has caused armature 82 and poppet rod 40 to move downward in the direction of arrow C to the second armature position. Movement in the direction of arrow C is caused by applying electrical current to coil 76 with a polarity that produces a magnetic polarity in coil 76 and armature 82 that is the same as the magnetic polarity of second magnet 94 as indicated by "N" for north and "S" for south on coil 76 and armature 82, thereby creating attraction between second magnet 94 and armature 82 which overcomes the magnetic attraction between armature 82 and first magnet 92 and also overcomes the hydraulic force acting on ball 34 from the fluid supplied by fluid source 14. Consequently, poppet rod tip 42 urges ball 34 off of supply valve seat 36 to permit communication of fluid from inlet port 26 to working port 28 at increased pressure due to less restriction between ball 34 and supply valve seat 36. It should be noted that first poppet rod shoulder 40a holds exhaust valve member 48 against valve seat in the second armature position, thereby preventing fluid communication between working port 28 and exhaust port 30. It should also be noted that the polarity applied to first terminal 78a and second terminal 78b to move armature 82 in the direction of Arrow C is the opposite from, i.e. first terminal 78a is negative and second terminal 78b is positive, the polarity used to move armature 82 in the direction of arrow B. The second armature position also causes armature 82 to be latched to second magnet 94 due to the magnetic attraction between armature 82 and second magnet 94, thereby allowing electrical current to coil 76 to be ceased while maintaining armature 82 in the second armature position, thereby maintaining ball 34 in the second ball position. When electric current to coil 76 is ceased, it should be understood that the polarity of coil 76 and armature 82 will also cease.

Figure 3:
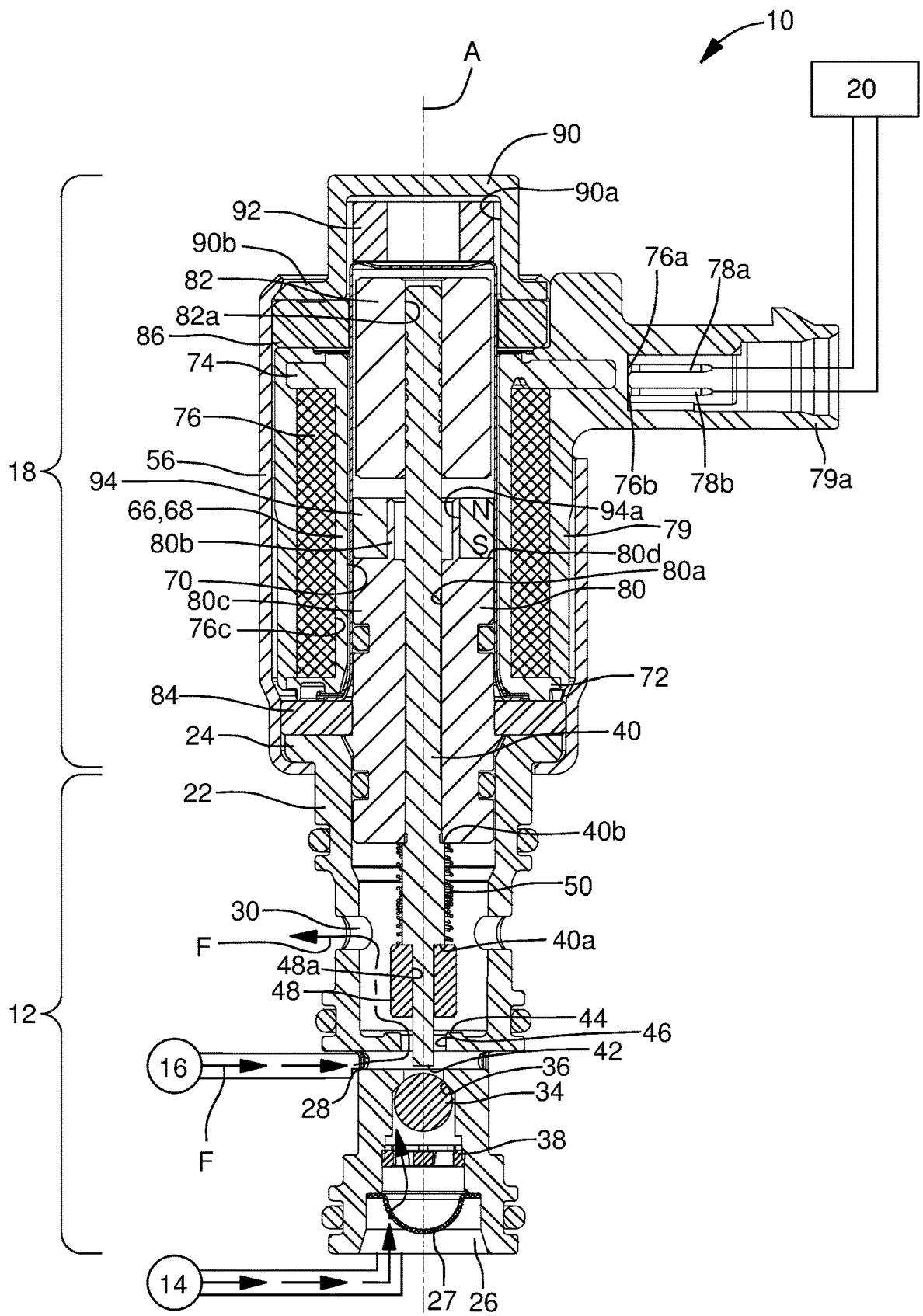
FIG. 3 is a cross-sectional view of the valve assembly of FIGS. 1 and 2 now shown in yet another operational state

In operation and now referring to FIG. 3, exhaust valve member 48 is shown unseated with exhaust seat 44 which may occur while armature 82 is moved to the first armature position. Exhaust valve member 48 is unseated with exhaust seat 44 due to pressure at working port 28 acting on exhaust valve member 48 and compressing exhaust valve spring 50. In this way fluid flows from working port 28 to exhaust port 30 as indicated by flow arrows F. After the pressure at working port 28 is reduced, exhaust valve spring 50 urges exhaust valve member 48 to seat with exhaust seat 44 as shown in FIG. 1. It should be noted that in FIG. 3, that electric current source 20 does not apply an electric current to coil 76, and consequently, the magnetic polarity of coil 76 and armature 82 has been omitted. It should be understood that exhaust valve member 48 may also unseat from exhaust seat 44 while armature 82 is latched in the first armature position in order to regulate pressure at working port 28. When pressure is being regulated, it should be understood that exhaust valve member 48 may be separated from exhaust seat 44 to a much smaller magnitude than shown in FIG. 3 and there would not be flow from working device 16 to exhaust port 30, but instead, there would be a small flow from inlet port 26 to exhaust port 30.

While valve assembly 10 has been described herein as a three-port valve, i.e. inlet port 26, working port 28, and exhaust port 30, it should be understood that the invention herein may also be applied to valve assemblies having a greater number of ports or a lesser number of ports. Furthermore, while the supply valve member has been illustrated as ball 34, it should be understood that the supply valve member may take other forms commonly used to alter fluid flow. Even furthermore, while the supply valve member has been illustrated as not being affixed with armature 82, it should be understood that the valve member may alternatively be fixed directly or indirectly with the armature such that movement of the armature directly affects the position of the inlet valve member in each direction of movement. Yet even furthermore, it should be understood that the magnetic circuit illustrated herein, i.e. coil 76, pole piece 80, primary plate 84, solenoid housing 56, and secondary plate 86, may be altered in numerous ways while benefiting from inclusion of first magnet 92 and second magnet 94 for latching, and consequently, the illustrated magnetic circuit is provided only by way of non-limiting example.

Valve assembly 10 as described herein which includes first magnet 92 and second magnet 94 allows for electrical current to be supplied to coil 76 only to change modes of operation, thereby saving electricity during steady-state operation. Furthermore, inclusion of first magnet 92 and second magnet 94 allows for omission of a return spring which is typically used to return the armature to one position. In this way, valve assembly 10 is free of springs which bias armature 82 to the first armature position and is as free of springs which bias armature 82 toward the second armature position.

While this invention has been described in terms of preferred embodiments thereof, it is not intended to be so limited, but rather only to the extent set forth in the claims that follow.

We claim:

1. A valve assembly comprising:
an inlet which communicates fluid into said valve assembly;
an outlet which discharges fluid from said valve assembly;
a valve seat between said inlet and said outlet;
a valve member which moves with respect to said valve seat between a first valve member position and a second valve member position such that said first valve member position provides greater restriction between said inlet and said outlet compared to said second valve member position; and
a solenoid subassembly which allows said valve member to move between said first valve member position and said second valve member position, said solenoid subassembly comprising:
a coil wound about an axis and having a coil first end and a coil second end;
an armature which reciprocates, based on polarity of an electrical current applied to said coil first end and said coil second end, between 1) a first armature position which allows said valve member to move to said first valve member position and 2) a second armature position which allows said valve member to move to said second valve member position;
a first magnet which latches said armature in said first armature position through magnetic attraction between said first magnet and said armature; and
a second magnet which latches said armature in said second armature position through magnetic attraction between said second magnet and said armature
wherein said solenoid subassembly further comprises a pole piece made of a magnetic material; and
wherein said second magnet circumferentially surrounds said pole piece.

2. A valve assembly as in claim 1 wherein:
said coil defines a passage extending axially therethrough; and
said second magnet is located within said passage.

3. A valve assembly as is claim 1 wherein said armature is located axially between, and axially aligned with, said first magnet and said second magnet.

4. A valve assembly as in claim 1 wherein:
said pole piece includes a pole piece first portion and a pole piece second portion such that said pole piece first portion is smaller in diameter than said pole piece second portion; and
said second magnet circumferentially surrounds said pole piece first portion of said pole piece.

5. A valve assembly as in claim 4 wherein:
a pole piece shoulder is defined where said pole piece first portion meets said pole piece second portion; and
said second magnet abuts said pole piece shoulder.

6. A valve assembly as in claim 1 wherein said valve assembly is free of springs which bias said armature toward said first armature position.

7. A valve assembly as in claim 6 wherein said valve assembly is free of springs which bias said armature toward said second armature position.

8. A valve assembly as in claim 1 wherein said second magnet is axially magnetized.

9. A valve assembly as in claim 1 wherein:
said coil defines a passage extending axially therethrough with said armature extending into said passage and said armature being circumferentially surrounded by said coil such that said electrical current applied to said coil first end and said coil second end magnetizes said armature with a polarity of said armature that is determined by said polarity of electrical current applied to said coil first end and said coil second end.

10. A valve assembly as in claim 9, wherein a first polarity of said armature causes opposite polarity between said second magnet and said armature, thereby causing magnetic repulsion between said second magnet and said armature.

11. A valve assembly as in claim 10, wherein a second polarity of said armature, which is opposite said first polarity, causes like polarity between said second magnet and said armature, thereby causing magnetic attraction between said magnet and said armature.

12. A valve assembly as in claim 1, wherein said armature moves relative to both said first magnet and said second magnet when said armature moves between said first valve member position and said second valve member position.

13. A valve assembly as in claim 1, wherein:
said armature is made of a magnetic material such that said electrical current applied to said coil first end and said coil second end magnetizes said magnetic material of said armature with a polarity of said armature that is determined by said polarity of electrical current applied to said coil first end and said coil second end;
said first magnet latches said armature in said first armature position through magnetic attraction between said first magnet and said magnetic material; and
said second magnet latches said armature in said second armature position through magnetic attraction between said second magnet and said magnetic material of said armature.

14. A valve assembly comprising:
an inlet which communicates fluid into said valve assembly;
an outlet which discharges fluid from said valve assembly;
a valve seat between said inlet and said outlet;
a valve member which moves with respect to said valve seat between a first valve member position and a second valve member position such that said first valve member position provides greater restriction between said inlet and said outlet compared to said second valve member position; and
a solenoid subassembly which allows said valve member to move between said first valve member position and said second valve member position, said solenoid subassembly comprising:
a coil wound about an axis and having a coil first end and a coil second end;
an armature which reciprocates, based on polarity of an electrical current applied to said coil first end and said coil second end, between 1) a first armature position which allows said valve member to move to said first valve member position and 2) a second armature position which allows said valve member to move to said second valve member position;
a first magnet which latches said armature in said first armature position through magnetic attraction between said first magnet and said armature; and
a second magnet which latches said armature in said second armature position through magnetic attraction between said second magnet and said armature;
wherein said coil defines a passage extending axially therethrough; and
wherein said second magnet is located within said passage.

15. A valve assembly comprising:
an inlet which communicates fluid into said valve assembly;
an outlet which discharges fluid from said valve assembly;
a valve seat between said inlet and said outlet;
a valve member which moves with respect to said valve seat between a first valve member position and a second valve member position such that said first valve member position provides greater restriction between said inlet and said outlet compared to said second valve member position; and
a solenoid subassembly which allows said valve member to move between said first valve member position and said second valve member position, said solenoid subassembly comprising:
a coil wound about an axis and having a coil first end and a coil second end;
an armature which reciprocates, based on polarity of an electrical current applied to said coil first end and said coil second end, between 1) a first armature position which allows said valve member to move to said first valve member position and 2) a second armature position which allows said valve member to move to said second valve member position;
a first magnet which latches said armature in said first armature position through magnetic attraction between said first magnet and said armature; and
a second magnet which latches said armature in said second armature position through magnetic attraction between said second magnet and said armature;
wherein said valve assembly is free of springs which bias said armature toward said first armature position; and
wherein said valve assembly is free of springs which bias said armature toward said second armature position.

* * * * *